United States Patent
Toko et al.

(10) Patent No.: US 9,354,481 B2
(45) Date of Patent: *May 31, 2016

(54) LIQUID CRYSTAL ELEMENT AND LIQUID CRYSTAL DISPLAY APPARATUS

(71) Applicant: STANLEY ELECTRIC CO., LTD.

(72) Inventors: Yasuo Toko, Tokyo (JP); Keisuke Kato, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 38 days.

This patent is subject to a terminal disclaimer.

(21) Appl. No.: 14/464,372

(22) Filed: Aug. 20, 2014

(65) Prior Publication Data

US 2015/0055039 A1 Feb. 26, 2015

(30) Foreign Application Priority Data

Aug. 21, 2013 (JP) ................. 2013-171591

(51) Int. Cl.
*G02F 1/1343* (2006.01)
*G02F 1/1337* (2006.01)
*G02F 1/139* (2006.01)

(52) U.S. Cl.
CPC ........ *G02F 1/1396* (2013.01); *G02F 1/134363* (2013.01); *G02F 2001/133746* (2013.01); *G02F 2001/134381* (2013.01)

(58) Field of Classification Search
CPC .................. G02F 1/1396; G02F 2001/133746; G02F 1/134363; G02F 1/133784; G02F 2001/134381
See application file for complete search history.

(56) References Cited

U.S. PATENT DOCUMENTS

| 5,424,004 A * | 6/1995 | Shinjo | C09K 19/46 252/299.61 |
| 6,456,348 B2 * | 9/2002 | Bryan-Brown | G02F 1/13378 349/128 |
| 8,711,311 B2 * | 4/2014 | Kaneko | G02F 1/133707 349/141 |
| 2003/0076455 A1 * | 4/2003 | Kwok | G02F 1/1391 349/99 |
| 2005/0260426 A1 * | 11/2005 | Kwok | G02F 1/133711 428/473.5 |

(Continued)

FOREIGN PATENT DOCUMENTS

| JP | 2510150 B2 | 6/1996 |
| JP | 2007293278 A | 11/2007 |

(Continued)

*Primary Examiner* — Paul Lee
*Assistant Examiner* — Jia Pan
(74) *Attorney, Agent, or Firm* — Holtz, Holtz & Volek PC

(57) ABSTRACT

To provide a liquid crystal element with a high contrast ratio capable of achieving both optical control that utilizes a memory property and optical control capable of supporting moving image displays. The two substrates are disposed with an angle formed by the respective orientation processing directions from 0° to less than 40°. The liquid crystal layer includes chiral material capable of generating a second orientation state that includes a twist different from that of the first orientation state in the liquid crystal molecules of the layer. The liquid crystal layer transitions from the second orientation state to the first orientation state and vice versa by the application of an electric field, and returns to the second orientation state when an electric field is applied in the second orientation state, thereby generating an orientation change in accordance with the size of the electric field, and the electric field is subsequently released.

12 Claims, 12 Drawing Sheets

(56) References Cited

U.S. PATENT DOCUMENTS

| | | | |
|---|---|---|---|
| 2006/0164351 A1* | 7/2006 | Hsu | G02F 1/1391 345/87 |
| 2007/0024782 A1* | 2/2007 | Kwok | G02F 1/1337 349/123 |
| 2011/0267564 A1* | 11/2011 | Kim | G02F 1/1395 349/86 |
| 2012/0300144 A1* | 11/2012 | Lee | G02F 1/139 349/33 |

FOREIGN PATENT DOCUMENTS

| | | |
|---|---|---|
| JP | 4238877 B2 | 3/2009 |
| JP | 2011203547 A | 10/2011 |

\* cited by examiner

Fig. 6
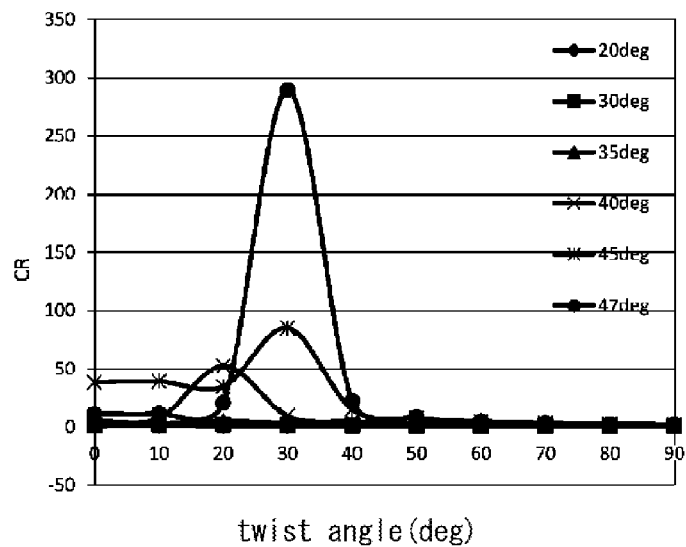
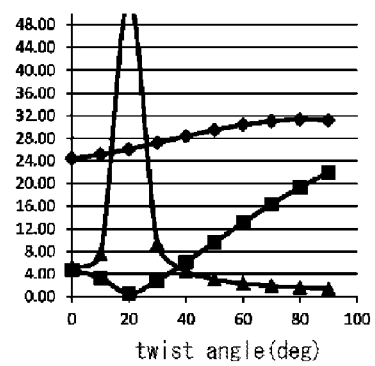
Fig. 7A
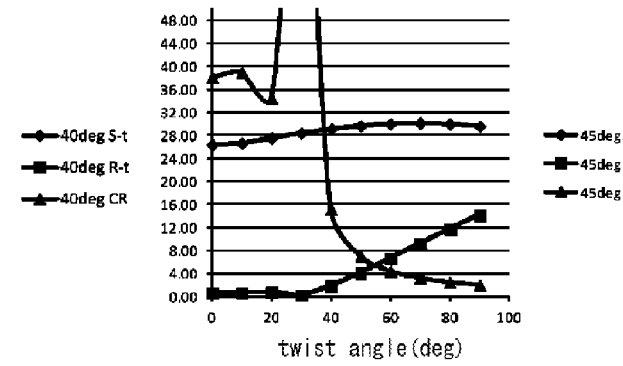
Fig. 7B
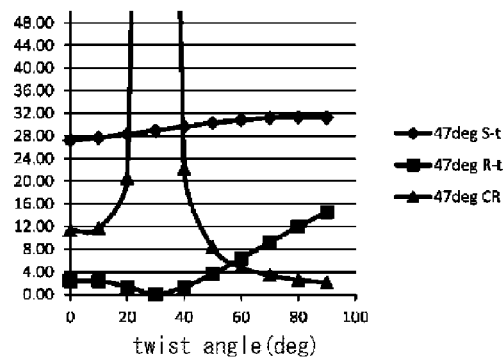
Fig. 7C

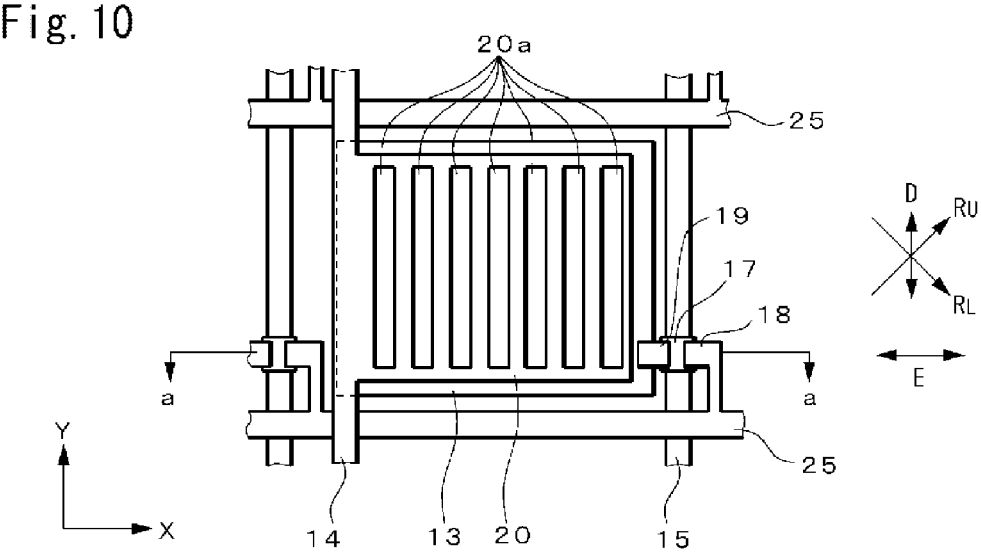

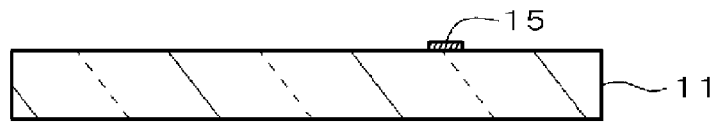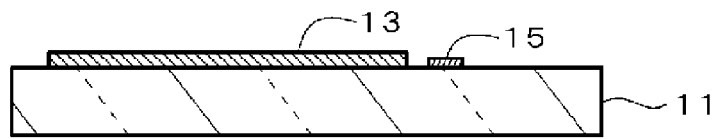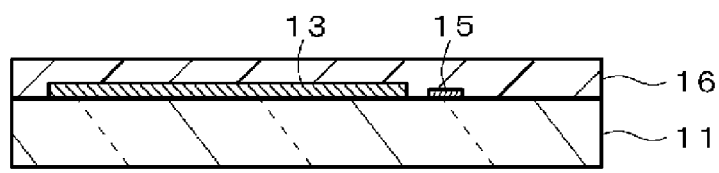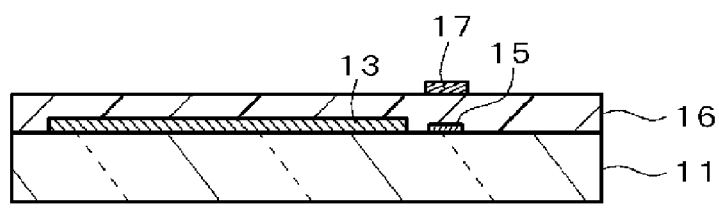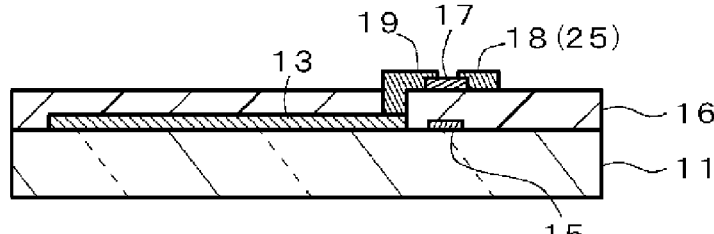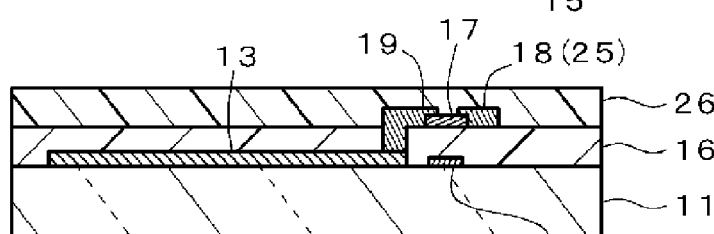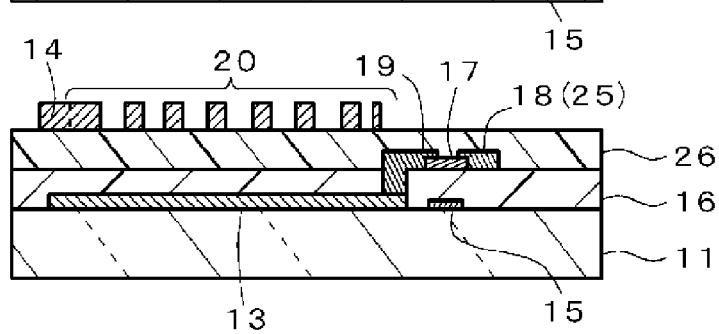

LIQUID CRYSTAL ELEMENT AND LIQUID CRYSTAL DISPLAY APPARATUS

BACKGROUND OF THE INVENTION

1. Field of the Invention

The present invention relates to a new liquid crystal element and a liquid crystal display apparatus that utilize a transition between two orientation states.

2. Description of the Background Art

Japanese Patent No. 2510150 (hereinafter referred to as "Patent Document 1") discloses a liquid crystal display apparatus in which electro-optical properties are improved by twisting and orienting the liquid crystal molecules in a turning direction that is opposite to a turning direction regulated by a combination of the directions of an orientation process performed on each of a pair of substrates disposed facing each other. Further, Japanese Unexamined Patent Application Publication No. 2007-293278 (hereinafter referred to as "Patent Document 2") discloses a liquid crystal element in which the strain inside a liquid crystal layer is increased by twisting and orienting the liquid crystal molecules in a turning direction (first turning direction) regulated by a combination of directions of an orientation process performed on each of a pair of substrates disposed facing each other, while adding a chiral agent twisted in a turning direction (second turning direction) opposite to the first turning direction, thereby decreasing the threshold voltage and making low voltage driving possible.

However, the liquid crystal display apparatus of Patent Document 1 described above has the disadvantage that the reversed twist orientation state is unstable and, although the reversed twist orientation state can be obtained by applying a relatively high voltage to the liquid crystal layer, the state transitions to a splayed twist state over time. Further, the liquid crystal element of Patent Document 2, while having the advantage of decreasing the threshold voltage as described above, has the disadvantage that the state quickly transitions to a splayed twist orientation state (in about a few seconds, for example) when the voltage is turned off, thereby conversely increasing the threshold voltage. Further, neither Patent Document 1 nor Patent Document 2 assumes positive utilization of the two splayed twist and reversed twist orientation states as an application for displays or the like. That is, there exists no disclosure or suggestion of a technical idea such as a driving method or configuration required to positively utilize bistability or the like.

Hence, the present inventors have been engaged in investigating a liquid crystal element of a new reverse twisted-nematic mode (hereinafter abbreviated as R-TN mode) that can resolve the disadvantages of the prior documents described above. For example, Japanese Unexamined Patent Application Publication No. 2011-203547 (hereinafter referred to as "Patent Document 3") discloses a technique related to an R-TN mode liquid crystal element that is in a splayed twist orientation in the initial state, but stabilizes in a reversed twist orientation when a vertical electric field is applied one time.

Further, the present inventors have been engaged in investigating a liquid crystal display apparatus in which a plurality of liquid crystal elements is arranged and each liquid crystal element is individually driven using a switching element such as a thin film transistor, as an embodiment of a liquid crystal display apparatus that uses the R-TN mode liquid crystal element described above. Hence, a structural example of a switching element and an electrode for driving using a horizontal electric field is disclosed in Japanese Patent No. 4238877 (hereinafter referred to as "Patent Document 4"), for example. Nevertheless, the structure of the switching element and the electrode such as disclosed in this Patent Document 4 is not suitable for driving the new R-TN mode liquid crystal element according to the present inventors.

However, while the R-TN mode liquid crystal element disclosed in Patent Document 3 is capable of static image display utilizing the memory property thereof, basically one of the two orientation states is selectively used, making the element not suitable for optical control that supports half-tone displays and moving image displays. Further, in the R-TN mode liquid crystal element disclosed in Patent Document 3, the contrast ratio from the front is not significantly high, and thus further improvement of the contrast ratio has been desired.

It is therefore an object of the specific aspects according to the present invention to provide a liquid crystal element with a high contrast ratio that is capable of achieving both optical control that utilizes a memory property and optical control capable of supporting moving image displays and the like.

Further, another object of the specific aspects according to the present invention is to provide a liquid crystal display apparatus with a high contrast ratio that is capable of achieving both displays that utilize a memory property and moving image displays and the like.

SUMMARY OF THE INVENTION

The liquid crystal element of an aspect according to the present invention is a liquid crystal element comprising (a) a first substrate and a second substrate subjected to an orientation process on one surface each, disposed facing each other, (b) a liquid crystal layer provided between the first substrate and the second substrate, and (c) electric field applying means that applies an electric field to the liquid crystal layer, wherein: (d) the first substrate and the second substrate are disposed with an angle formed by the respective orientation processing directions greater than or equal to 0° and less than 70°, making it possible to achieve a first orientation state that includes a twist in the liquid crystal molecules of the liquid crystal layer by an orientation regulating force from orientation processing, (e) the liquid crystal layer includes chiral material capable of generating a second orientation state that includes a twist different from that of the first orientation state in the liquid crystal molecules of the liquid crystal layer, and (f) the liquid crystal layer transitions from the second orientation state to the first orientation state by the application of an electric field in a layer thickness direction of the liquid crystal layer by the electric field applying means, transitions from the first orientation state to the second orientation state by the application of an electric field in a direction perpendicular to the layer thickness direction by the electric field applying means, and returns to the second orientation state when the electric field is applied in the orthogonal direction by the electric field applying means in the second orientation state, thereby generating an orientation change in accordance with the size of the electric field, and the electric field is subsequently released.

According to the above described configuration, optical control that utilizes a memory property by utilizing a transition between the first orientation state and the second orientation state can be achieved, and optical control that supports half-tone displays and moving image displays by generating an orientation change according to the strength of the electric field by further using an electric field of a direction perpendicular to the layer thickness direction of the liquid crystal layer in the second orientation state can be achieved. Further, by adopting the range of the angle formed by the orientation processing directions described above, it is possible to improve the contrast ratio.

In the above described liquid crystal element, the electric field applying means preferably comprises a first electrode provided on one surface side of the first substrate, a second electrode provided on one surface side of the first substrate, away from the first electrode, and a common electrode provided on one surface side of the second substrate so that at least a portion thereof is superimposed with the first electrode and the second electrode.

With this arrangement, it is possible to freely produce an electric field of a layer thickness direction of the liquid crystal layer, and an electric field of a direction perpendicular thereto.

The above described liquid crystal element preferably further comprises a switching element that is provided on one surface side of the first substrate and connected to the first electrode or the second electrode.

With this arrangement, it is possible to obtain a liquid crystal element suitable for an active matrix driven type display apparatus.

In the above described liquid crystal element, the first substrate and the second substrate each preferably impart a pretilt angle of 35° or greater and 47° or less to the liquid crystal molecules of the liquid crystal layer on the boundary surface with the liquid crystal layer.

With this arrangement, it is possible to further increase the bistability of the two orientation states.

In the above described liquid crystal element, at least one of the first electrode and the second electrode preferably comprises a plurality of linear parts disposed parallel to and away from each other. In this case, more preferably, the orientation directions of the liquid crystal molecules in the substantial center of the layer thickness direction of the liquid crystal layer in the first orientation state comprise an angle of 0° to 45° with respect to the extending direction of each of the plurality of linear parts.

With this arrangement, it is possible to apply an electric field (horizontal electric field) of a direction parallel to the substrate surface, which is required for generating a transition between two orientation states, to the liquid crystal layer more effectively.

The liquid crystal display apparatus of an aspect according to the present invention is a liquid crystal display apparatus that comprises a plurality of pixel parts, wherein each of the plurality of pixel parts is configured using the liquid crystal element according to the present invention described above.

According to the above described configuration, it is possible to obtain a liquid crystal display apparatus of low power consumption that utilizes the bistability (memory property) of two orientation states of a liquid crystal element, and is capable of half-tone displays as well as moving image displays. Further, by adopting a specific twist angle value, it is possible to improve the contrast ratio.

BRIEF DESCRIPTION OF THE DRAWINGS

FIG. 6 is a diagram showing the simulation results of the relationship between twist angle and contrast ratio at various pretilt angle settings.

FIG. 7A shows the simulation result in detail when the pretilt angle was 40°, FIG. 7B shows the simulation result in detail when the pretilt angle was 45°, and FIG. 7C shows the simulation result in detail when the pretilt angle was 47°.

FIG. 10 is a plan view of the R-TN mode liquid crystal element shown in FIG. 9.

FIGS. 11A-G are cross-sectional views showing an example of a manufacturing method of the R-TN mode liquid crystal element of embodiment 1.

DESCRIPTION OF THE PREFERRED EMBODIMENTS

The following describes embodiments of the present invention with reference to drawings.

Figure 1:
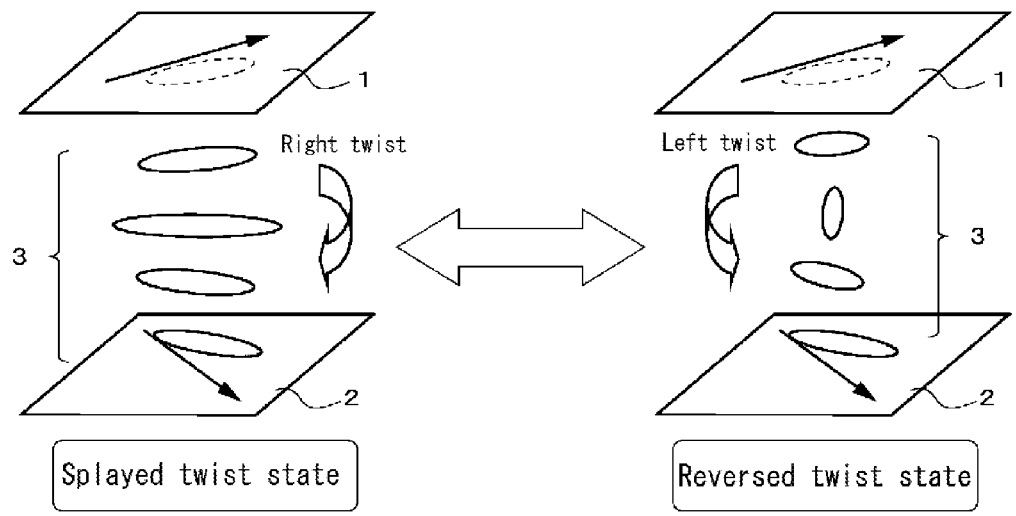
FIG. 1 is a schematic diagram schematically showing the principle of an R-TN mode liquid crystal element.

FIG. 1 is a schematic diagram schematically showing the principle of an R-TN mode liquid crystal element. An R-TN mode liquid crystal element comprises an upper substrate 1 and a lower substrate 2 disposed facing each other, and a liquid crystal layer 3 provided therebetween as a basic configuration. An orientation process represented by a rubbing process, is performed on the respective surfaces of the upper substrate 1 and the lower substrate 2. The directions of these orientation processes (indicated by arrows in the figure) are made to mutually intersect, and thus the upper substrate 1 and the lower substrate 2 are relatively disposed. The liquid crystal layer 3 is formed by injecting a nematic liquid crystal material between the upper substrate 1 and the lower substrate 2. A liquid crystal material in which a chiral material that generates an action that twists the liquid crystal molecules in a specific direction (a right turning direction in the example of the figure shown) of an azimuth direction thereof was added is used for this liquid crystal layer 3. Given d as the gap (cell thickness) between the upper substrate 1 and the lower substrate 2 and p as the chiral pitch of the chiral material, the value of the ratio d/p of these is set to about 0.04-0.75, for example. In the initial state, such an R-TN mode liquid crystal element is in a splayed twist state (second orientation state) wherein the liquid crystal layer 3 is twisted while oriented in a splayed orientation by the action of the chiral material. When voltage exceeding the saturation voltage is applied to the liquid crystal layer 3 in this splayed twist state in the layer thickness direction thereof, the state transitions to a reversed twist state (first orientation state) in which the liquid crystal molecules are twisted in a left turning direction. In the liquid crystal layer 3 in such a reversed twist state, the liquid crystal molecules in the bulk are tilted, resulting in the effect of decreasing the drive voltage of the liquid crystal element.

Figure 2A:
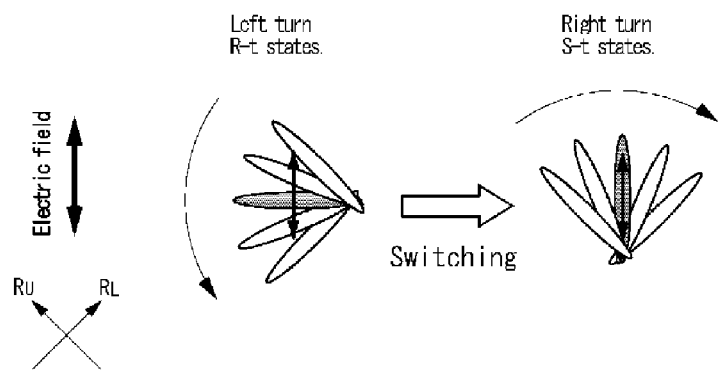
FIG. 2A is a conceptual diagram for describing the relationship between the electric field direction and the orientation state of the liquid crystal layer when its state transitions from a reversed twist state to a splayed twist state.

FIG. 2A is a conceptual diagram for describing the relationship between the electric field direction and the orientation state of the liquid crystal layer when the state transitions from a reversed twist state to a splayed twist state. It should be noted that the liquid crystal material here is considered a material with a positive dielectric anisotropy $\Delta\in$. As shown on the left side of FIG. 2A, the application direction of the electric field is set so that the longitudinal direction of the liquid crystal molecule in the substantial center of the layer thickness direction of the liquid crystal layer in the reversed twist state (the liquid crystal molecule shaded in the figure) is not parallel but rather perpendicular or nearly perpendicular to the electric field of a horizontal direction on the substrate surface, to the extent possible. As a result, the liquid crystal molecule in the substantial center of the layer thickness direction of the liquid crystal layer is reoriented along the electric field direction, and thus the orientation state of the liquid crystal layer transitions from the reversed twist state (R-t state) to the splayed twist state (S-t state), as shown on the right side of FIG. 2A. It should be noted that, in a case where an electric field is applied to the liquid crystal layer in a reversed twist state so that the longitudinal direction of the liquid crystal molecule in the substantial center of the layer thickness direction is parallel or nearly parallel thereto, a transition from the reversed twist state to the splayed twist state substantially does not occur. This is because reorientation of the liquid crystal molecules by the electric field substantially does not occur in the substantial center of the layer thickness direction of the liquid crystal layer.

Thus, to make the R-TN mode liquid crystal element freely transition between the two orientation states, an electric field (vertical electric field) in the layer thickness direction of the liquid crystal layer and an electric field (horizontal electric field) perpendicular thereto need to be produced. However, when half tone display is considered as will be described later, it is not always optimal to arrange the longitudinal direction of a liquid crystal molecule in the substantial center of the layer thickness direction of the liquid crystal layer in a splayed twist state and the direction of the horizontal electric field in parallel completely, but if the angle of the two directions range from 0° to 45° (0° being parallel), a transition from the reversed twist state to the splayed twist state is possible.

Figure 2B:
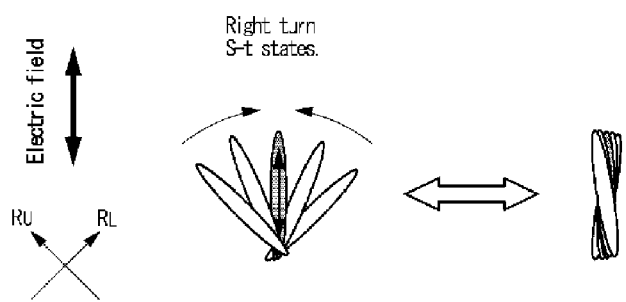
FIG. 2B is a conception diagram of when the orientation is further changed from the splayed twist state.

FIG. 2B is a conception diagram of when the orientation is further changed from the splayed twist state. In the R-TN mode liquid crystal element described above, while the state does not transition to a reversed twist state even if a horizontal electric field is further applied to the liquid crystal layer in a splayed twist state, the orientation changes in the bulk, excluding the area near the boundary surface with the substrate of the liquid crystal layer, so that the liquid crystal molecules match the electric field direction. In this case, the orientation state of the liquid crystal layer can be continually changed according to the strength of the electric field and an orientation state that is close to a homogenous orientation can be achieved by increasing the strength of the electric field by a certain degree or greater, making it possible to control transmitted light or reflected light. Further, the orientation state of the liquid crystal layer is restored to the original splayed twist state if the application of the electric field is stopped. That is, the orientation change of the liquid crystal layer here, so to speak, can be regarded as an elastic deformation, and optical control capable of supporting half-tone displays and moving image displays is possible by utilizing this change.

Figure 3A:
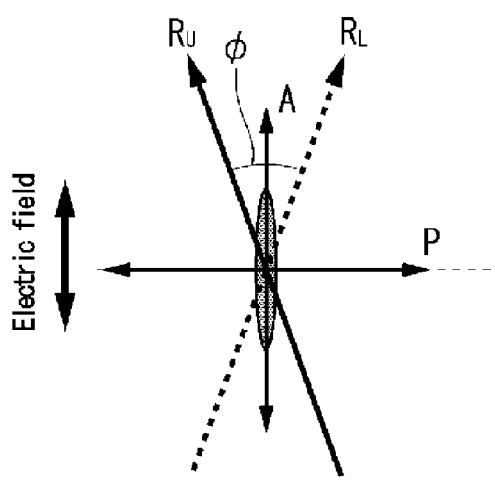
FIGS. 3A-C are diagrams respectively showing the relationship between the direction of the orientation process and the horizontal electric field.
Figure 3B:
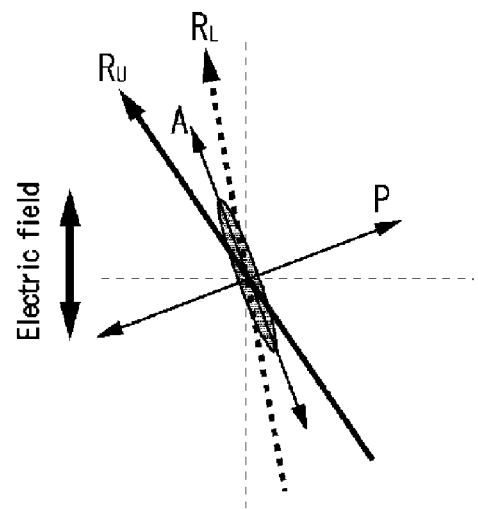
Figure 3C:
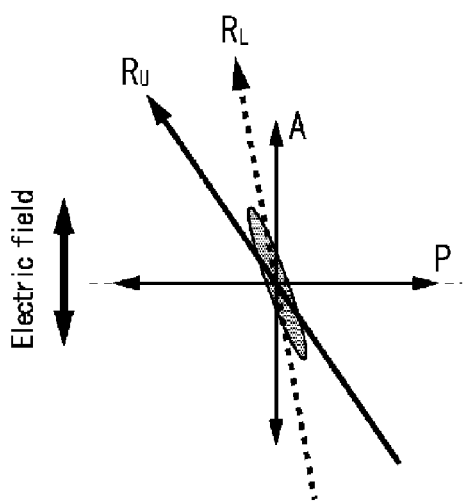

It should be noted that, in principle, the closer that the orientation direction of the liquid crystal molecule in the substantial center of the layer thickness direction of the liquid crystal layer in the splayed twist state is to a direction parallel or nearly parallel to the horizontal electric field, the more readily the liquid crystal molecules of the liquid crystal layer will match the electric field direction when the horizontal electric field is applied. Based on this point, as shown in FIG. 3A, the orientation direction of a liquid crystal molecule in the substantial center of the layer thickness direction of a liquid crystal layer 3 substantially matches the direction of a bisector of angle ϕ formed by an orientation processing direction $R_U$ of the upper side substrate 1 and an orientation processing direction $R_L$ of the lower side substrate 2, and thus the angle formed by the orientation direction of this liquid crystal molecule and the direction of the horizontal electric field is preferably 0°, that is, the two are preferably parallel. On the other hand, when half tone display is also considered as described above, as shown in FIG. 3B and FIG. 3C, the relationship between the longitudinal direction of a liquid crystal molecule in the substantial center of the layer thickness direction of the liquid crystal layer in a splayed twist state and the direction of the horizontal electric field is a range greater than 0° and less than or equal to 45°, allowing appropriate selection of favorable conditions. The orientation state of the liquid crystal layer 3 in the case shown in FIG. 3A is one in which the twisted orientation in the splayed twist state has collapsed (the twist has become undone). Conversely, the orientation states of the liquid crystal layer 3 in the cases shown in FIG. 3B and FIG. 3C are ones in which the director direction of the liquid crystal molecule differs from that of the splayed twist state, more specifically, a mixture of a state in which the twisted orientation collapsed and a state with a different director direction.

Note that while FIG. 2A and FIG. 2B have been drawn so that the liquid crystal molecules near the substrate interface are also orientated in the electric field direction for convenience of illustration, in actuality the liquid crystal molecules near the substrate interface may conceivably be not orientated in the electric field direction due to the anchoring energy of the substrate interface. Then, the liquid crystal molecules in positions slightly separated from the area near the substrate interface (generally, in positions where there are several liquid crystal molecules) may conceivably be gradually orientated with an incline in the electric field direction, and the liquid crystal molecules in the substantial center of the layer thickness direction of the liquid crystal layer may conceivably be oriented in the substantial electric field direction.

Next, the results of a study on the favorable ranges of the pretilt angle and twist angle by computer simulation from the viewpoint of improving the contrast ratio from a front direction of the liquid crystal element will be described. As calculation conditions, a cell thickness d and a refractive index anisotropy Δn were set to 6.5 μm and 0.066, respectively, the twist angle was set within the range of 0° to 90°, and the added amount of chiral material was set so that d/p was within the range of 0 to 0.5, based on the premise of a liquid crystal element with the structure shown in FIG. 1 described above. Further, the respective polarizing plates were disposed so that at least one of absorption axes A and P of the respective polarizing plates formed an angle of 0° or 90° with respect to the orientation direction of the liquid crystal molecules in the substantial center of the layer thickness direction of the liquid crystal layer as shown in FIG. 3A, and the absorption axes of the respective polarizing plates intersected. Further, the pretilt angle was also set to various values.

Figure 4:
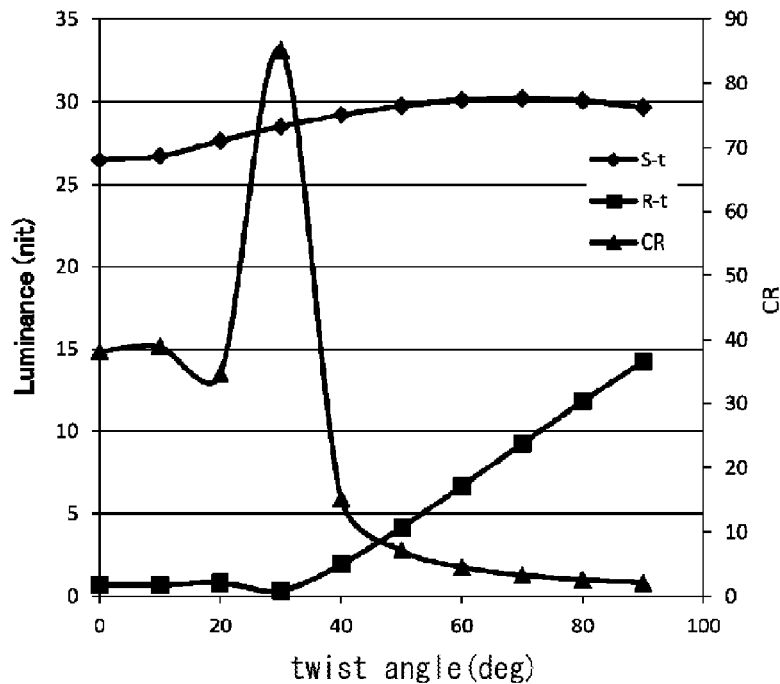
FIG. 4 is a diagram showing the simulation results of the twist angle dependency of the transmittance and contrast of the R-TN mode liquid crystal element.

FIG. 4 is a diagram showing the simulation results of the twist angle dependency of the transmittance and contrast of the R-TN mode liquid crystal element. The term "twist angle" here refers to the twist angle in the splayed twist state (hereinafter the same). Note that, in the figure, "S-t" indicates the splayed twist state, "R-t" indicates the reversed twist state, and "CR" indicates the contrast ratio from the substrate surface normal direction of the liquid crystal element (hereinafter the same). Further, the pretilt angle of the R-TN mode liquid crystal element was set to 45°, d/p was set to 0.1, and the twist angle was set within the range of 0° to 90°. As shown, the results reveal that the contrast ratio tends to increase as the twist angle decreases, as a whole. Further, the results also reveal that there exists a numerical range of the twist angle in which the contrast ratio becomes particularly high.

Figure 5:
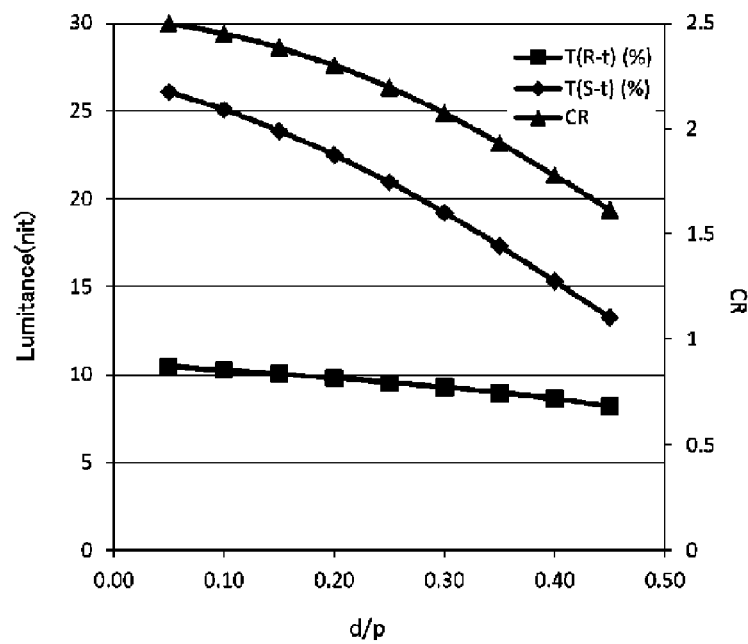
FIG. 5 is a diagram showing the simulation results of the d/p dependency of the transmittance and contrast of the R-TN mode liquid crystal element.

FIG. 5 is a diagram showing the simulation results of the d/p dependency of the transmittance and contrast of the R-TN mode liquid crystal element. Here, the pretilt angle of the R-TN mode liquid crystal element was set to 40°, the twist angle was set to 70°, and d/p was set within the range of 0.05 to 0.45. As shown, the results reveal that, under these conditions, the contrast ratio increases as d/p decreases.

FIG. 6 is a diagram showing the simulation results of the relationship between twist angle and contrast ratio at various pretilt angle settings. Here, d/p was set to 0.1 (pitch: 65 μm). Further, the pretilt angle was set to 20°, 30°, 35°, 40°, 45°, and 47°. FIG. 7A shows the simulation result in detail when the pretilt angle was 40°, FIG. 7B shows the simulation result in detail when the pretilt angle was 45°, and FIG. 7C shows the simulation result in detail when the pretilt angle was 47°. As shown in the respective figures, it is evident that the contrast ratio tends to increase as the pretilt angle increases, on the whole. Specifically, the results reveal that, if the pretilt angle setting is 35° and 40°, the contrast ratio is highest when the twist angle is 20°; and if the pretilt angle setting is 45° and 47°, the contrast ratio is highest when the twist angle is 30°. Further, the results reveal that a relatively high contrast ratio is obtained with the twist angle within the range of 0° to 40°, no matter the pretilt angle setting. Further, the results reveal that the contrast ratio falls below 4 when the twist angle reaches 70°. Here, a contrast ratio of 4 is a representative contrast ratio of a newspaper. The conclusion can be drawn that a contrast ratio preferable in terms of practical use can be obtained given a contrast ratio above 4. Note that, when the pretilt angle settings were further increased, bistability became more difficult to achieve at settings higher than 48° and could not be achieved when the pretilt angle was set to 50°, in general. Based on this, it can be said that the upper limit of the favorable pretilt angle is 47°.

Such simulation results as described above reveal that an effect that improves the contrast ratio from the front direction can be achieved by setting the pretilt angle to a relatively high 35° to 47°, and setting the twist angle of the liquid crystal layer 60 in the splayed twist state to 0° to less than 70° (more preferably 0° to 40°). Note that, while the ideal pretilt angle is close to 45° based on characteristic aspects, a pretilt angle of about 35° to 40° is preferred from the viewpoint of fabricating liquid crystal elements with favorable reproducibility (that is, a high production yield).

Figure 8:
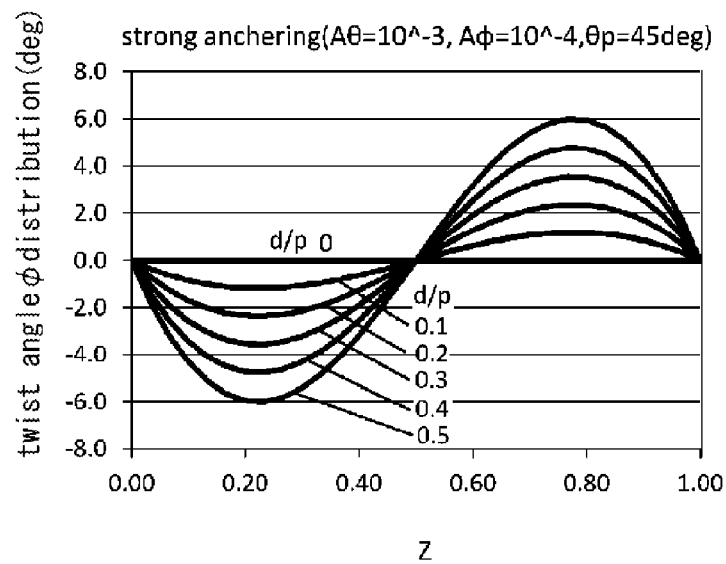
FIG. 8 is a diagram showing the simulation results of orientation distribution in the case of the 0° twist angle.

Note that, with regard to the reason relatively favorable results were achieved with a 0° twist angle as described above, the orientation distribution of the liquid crystal molecules inside the liquid crystal layer were verified based on simulation results. FIG. 8 is a diagram showing the simulation results of orientation distribution in the case of the 0° twist angle. As shown, the results reveal that, even if the apparent twist angle regulated based on the relationship of the orientation processing directions of the respective substrates is 0°, a twist is generated in the orientation of the liquid crystal molecules in the bulk of the liquid crystal layer (excluding cases where d/p=0). Specifically, an orientation distribution in which the twist angle is a negative value on one substrate side, 0° in the substantial center in the layer thickness direction of the liquid crystal layer, and a positive value on the other substrate side is obtained. Note that while, in addition to the conditions described above, the elastic constants were set to K11=11.4 (pN), K22=5.7 (pN), and K33=16.2 (pN), the interface anchoring energy was set to so-called strong anchoring conditions, and the pretilt angle was set to 45° as simulation conditions under which the results shown in FIG. 8 were achieved, this is merely an example and the same tendencies can be obtained under other numerical conditions as well.

Next, a more detailed embodiment of the R-TN mode liquid crystal element will be explained.

Embodiment 1

Figure 9:
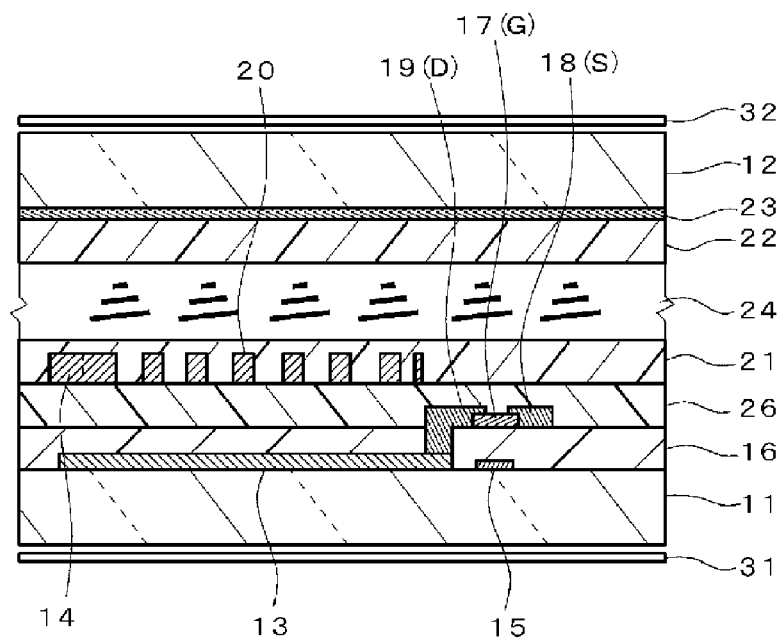
FIG. 9 is a cross-sectional view showing a configuration example of the R-TN mode liquid crystal element of embodiment 1.

FIG. 9 is a cross-sectional view showing a configuration example of the R-TN mode liquid crystal element of embodiment 1. Further, FIG. 10 is a plan view of the R-TN mode liquid crystal element shown in FIG. 9. It should be noted that FIG. 9 shows a cross-section along a line a-a shown in FIG. 10. The R-TN mode liquid crystal element of this embodiment shown in each figure is configured to comprise a first substrate (lower substrate) 11, a second substrate (upper substrate) 12, a first electrode 13, a common line 14, a scan line 15, an insulation film 16, a semiconductor film 17, a source electrode 18, a drain electrode 19, a second electrode 20, a first alignment film 21, a second alignment film 22, a common electrode 23, a liquid crystal layer 24, a signal line 25, an insulation film 26, a first polarizing plate (lower polarizing plate) 31, and a second polarizing plate (upper polarizing plate) 32.

The first substrate 11 and the second substrate 12 are disposed facing each other, and each is a transparent substrate, such as a glass substrate, plastic substrate, or the like, for example. Multiple spacers (granules) are disposed in a dispersed manner (not shown) between the first substrate 11 and the second substrate 12, and a gap between the first substrate 11 and the second substrate 12 is maintained by these spacers.

The first electrode 13 is provided on one surface side of the first substrate 11. The first electrode 13 is formed into a substantially rectangular shape, for example, as shown in FIG. 10, and a part thereof is connected to the drain electrode 19. This first electrode 13 is obtained by patterning a transparent conductive film such as indium-tin oxide (ITO), for example.

The common line 14 is provided on the insulation film 26 on one surface side of the first substrate 11, and extends in one direction (a direction Y shown in FIG. 10). This common line 14 is connected to the second electrode 20 as shown in FIG. 10, and a predetermined electric potential is applied to the second electrode 20 via this common line 14. As the common line 14, a metal film such as a layered film of aluminum and molybdenum is used, for example. It should be noted that the common line 14 may be provided on one surface side of the insulation film 16 and extended in one direction (a direction X shown in FIG. 10) parallel to the signal line 25 and substantially perpendicular to the scan line 15. In this case, since the signal line 25 and the common line 14 do not intersect, the common line 14 may be integrally formed with the signal line 25 and the source electrode 18. As the wiring, similar to the signal line 25, a metal film such as a layered film of aluminum and molybdenum is used, for example. Further, in this case, formation of the insulation film 26 described later may be omitted.

The scan line 15 is provided on one surface side of the first substrate 11, and extends in one direction (the direction Y shown in FIG. 10). The scan line 15 in this example is disposed sandwiching the first electrode 13 with the common line 14 in the planar view, as shown in FIG. 10. As the scan line 15, a metal film such as a layered film of aluminum and molybdenum is used, for example.

The insulation film 16 is provided on one surface side of the first substrate 11, covering the first electrode 13 and the scan line 15. As this insulation film 16, a silicon nitride film, a silicon oxide film, or a layered film thereof is used, for example.

The semiconductor film 17 is provided to a predetermined position on the insulation film 16, superimposed with the scan line 15. This semiconductor film 17 is patterned into an island shape, as shown in FIG. 10. As the semiconductor film 17, an amorphous silicon film is used, for example. The section of the scan line 15 that overlaps with the semiconductor film 17 functions as a gate electrode of a thin film transistor. Further, the section of the insulation film 16 that overlaps with the semiconductor film 17 functions as a gate insulation film of the thin film transistor.

The source electrode 18 is provided to a predetermined position on the insulation film 16, and a part thereof is connected to the semiconductor film 17. The source electrode 18 in this example is integrally formed with the signal line 25, as shown in FIG. 10. As the source electrode 18 and the signal line 25, a metal film such as a layered film of aluminum and molybdenum is used, for example.

The drain electrode 19 is provided to a predetermined position on the insulation film 16, and a part thereof passes through the insulation film 16 and is connected to the first electrode 13. As this drain electrode 19, a metal film such as a layered film of aluminum and molybdenum is used, for example.

The second electrode 20 is provided to a predetermined position on the insulation film 26, and at least a part thereof is superimposed with the first electrode 13 described above. This second electrode 20 comprises a plurality of openings (slits) 20a, as shown in FIG. 10. This second electrode 20 is connected to the common line 14, as shown in FIG. 10. In this example, the second electrode 20 is integrally formed with the common line 14, and is obtained by patterning a transparent conductive film such as indium-tin oxide (ITO), for example. The size of the second electrode 20 can be set so that the width of the linear part that exists between each of the openings 20a (the length in the direction X in FIG. 10) is approximately 20 μm, and the width of each of the openings 20a (the length in the direction X in FIG. 10) is approximately 20 μm, for example. A horizontal electric field can be applied to the liquid crystal layer 24 by applying voltage between this second electrode 20 and the above described first electrode 13.

The first alignment film 21 is provided on the insulation film 26 on one surface side of the first substrate 11, covering the semiconductor film 17, the source electrode 18, the drain electrode 19, and the second electrode 20. Similarly, the second alignment film 22 is provided on one surface side of the second substrate 12, covering the common electrode 23. A uniaxial orientation process (such as a rubbing process or an optical orientation process, for example) is performed on the first alignment film 21 and the second alignment film 22, respectively. As the first alignment film 21 and the second alignment film 22 of this embodiment, a film that expresses a relatively high pretilt angle (20° or greater, more preferably about 35°±10°) is used. The direction of the orientation process of the first alignment film 21 and the direction of the orientation process of the second alignment film 22 are set so that an orientation direction D of the liquid crystal molecule in the substantial center of the layer thickness direction when the orientation state of the liquid crystal layer 24 is in a reversed twist state is substantially perpendicular to an electric field direction E produced by the first electrode 13 and the second electrode 20 (refer to FIG. 10).

The common electrode 23 is provided on one surface side of the second substrate 12. This common electrode 23 is formed so that at least a part thereof is superimposed with the first electrode 13 and the second electrode 20. This common electrode 23 is obtained by patterning a transparent conductive film such as indium-tin oxide (ITO), for example. A vertical electric field can be applied to the liquid crystal layer 24 by applying voltage between this common electrode 23 and the above described first electrode 13 (or the second electrode 20).

The liquid crystal layer 24 is provided between one surface of the first substrate 11 and one surface of the second substrate 12. In this embodiment, the liquid crystal layer 24 is configured using a nematic liquid crystal material with a positive dielectric anisotropy $\Delta\in$ ($\Delta\in$>0). The bold lines shown in the liquid crystal layer 24 schematically indicate the liquid crystal molecules inside the liquid crystal layer 24. The liquid crystal molecules at the time no voltage is applied are oriented with a predetermined pretilt angle with respect to each substrate surface of the first substrate 11 and the second substrate 12. Further, the angle formed by directions RU and RL (refer to FIG. 10) of the respective orientation processes of the first alignment film 21 and the second alignment film 22 is set to about 0°-40°, for example, thereby twisting and orienting the liquid crystal molecules of the liquid crystal layer 24 to azimuth angle direction between the first substrate 11 and the second substrate 12 at the time no voltage is applied.

The signal line 25 is provided on one surface side of the insulation film 16, and extends in one direction (the direction X shown in FIG. 10) substantially perpendicular to the common line 14 and the scan line 15. The signal line 25 in this example is integrally formed with the source electrode 18, as shown in FIG. 10. As the signal line 25, a metal film such as a layered film of aluminum and molybdenum is used, for example. It should be noted that while the above describes a case where the signal line 25 is provided on one surface side of the insulation film 16 and extends in one direction (the direction X shown in FIG. 10) substantially perpendicular to the common line 14 and the scan line 15, the signal line 25 may be provided on one surface side of the insulation film 16 and extend in one direction (the direction X shown in FIG. 10) parallel to the common line 14 and substantially perpendicular to the scan line 15. In this case, since the signal line 25 and the common line 14 do not intersect, the common line 14 may be integrally formed with the signal line 25 and the source electrode 18. As the wiring, similar to the common line 14, a metal film such as a layered film of aluminum and molybdenum is used, for example. Further, in this case, formation of the insulation film 26 described later may be omitted.

The insulation film 26 is provided on the insulation film 16 on one surface side of the first substrate 11, covering the semiconductor film 17, the source electrode 18, and the drain electrode 19. As this insulation film 26, a silicon nitride film, a silicon oxide film, or a layered film thereof is used, for example.

The first polarizing plate 31 is disposed on the outer side of the first substrate 11. The second polarizing plate 32 is disposed on the outer side of the second substrate 12. In this embodiment, a visual check is performed by the user from this second polarizing plate 32 side. The first polarizing plate 31 and the second polarizing plate 32 are disposed so that the transmission axes thereof are substantially perpendicular to each other, for example (crossed-Nicol alignment).

Next, an example of the manufacturing method of the R-TN mode liquid crystal element according to embodiment 1 will be described with reference to FIGS. 11A-11G and FIGS. 12A-12E.

First, a glass substrate for use as the first substrate 11 and the second substrate 12 is prepared. For example, a glass substrate made of a non-alkaline glass with a plate thickness of 0.7 mm is used. Then, the scan line 15 made of a predetermined metal film is formed on one surface of the first substrate 11 (FIG. 11A). Specifically, an aluminum film is formed over the entire one surface of the first substrate 11 by a film forming method, such as a sputtering method, for example, and a molybdenum film is further formed thereon. Subsequently, the layered film of the aluminum film and the molybdenum film is patterned by a dry etching method or the like.

Next, the first electrode 13 made of an ITO film or the like is formed in a predetermined position on one surface side of the first substrate 11 (FIG. 11B). Specifically, an indium-tin oxide film (ITO film) is formed over the entire one surface of the first substrate 11 by a film forming method such as a sputtering method, for example. Subsequently, this ITO film is patterned by a wet etching method or the like.

Next, the insulation film 16 is formed on one surface side of the first substrate 11, covering the first electrode 13 and the scan line 15 (FIG. 11C). Specifically, a silicon nitride film is formed by a film forming method such as a sputtering method or a plasma CVD (Chemical Vapor Deposition) method, for example.

Next, the semiconductor film 17 is formed in a predetermined position on the insulation film 16 of the first substrate 11 (FIG. 11D). Specifically, an amorphous silicon film is formed over the entire one surface of the first substrate 11 by a film forming method such as a plasma CVD method or the like, for example. Subsequently, this amorphous silicon film is patterned in an island shape by a dry etching method or the like.

Next, the source electrode 18, the drain electrode 19, and the signal line 25 are formed in predetermined positions on the insulation film 16 of the first substrate 11 (FIG. 11E). Specifically, a layered film of a molybdenum film/aluminum film/molybdenum film is formed over the entire one surface of the first substrate 11 by a film forming method such as a sputtering method, for example. Subsequently, this layered film is patterned by a dry etching method or the like. The drain electrode 19 can be formed by providing an opening that exposes a part of the first electrode 13 in a predetermined position of the insulation film 16 in advance, subsequently forming a metal film by a sputtering method or the like, and then executing patterning.

Next, on the insulation film 16 of the first substrate 11, the insulation film 26 that covers the semiconductor film 17, the source electrode 18, a drain electrode 19, and the signal line 25 is formed (FIG. 11F). Specifically, a silicon nitride film is formed by a film forming method such as a sputtering method or a plasma CVD (Chemical Vapor Deposition) method, for example.

Next, the common line 14 and the second electrode 20 are formed in predetermined positions on the insulation film 26 of the first substrate 11 (FIG. 11G). Specifically, an ITO film is formed over the entire one surface of the first substrate 11 by a film forming method such as a sputtering method, for example. Subsequently, this ITO film is patterned by a wet etching method or the like. It should be noted that a passivation film may be further provided on the insulation film 26 (not shown).

Figure 12A:
FIGS. 12A-E are cross-sectional views showing another example of a manufacturing method of the R-TN mode liquid crystal element of embodiment 1.
Figure 12B:
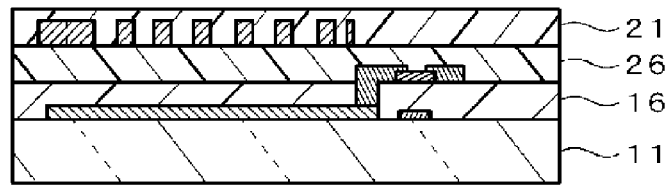

On the other hand, the common electrode 23 is formed on one surface of the second substrate 12 (FIG. 12A). Specifically, an ITO film is formed over the entire one surface of the second substrate 12 by a film forming method such as a sputtering method, for example. It should be noted that, in a case where the common electrode 23 exists on the entire substrate surface in the actual manufacturing process, the possibility exists that a short circuit from the main seal part, film separation during breaking from the scribe, or the like may occur, and therefore shielding (regulating) the outer circumference using a metal mask or the like during sputtering is preferred.

Figure 12C:
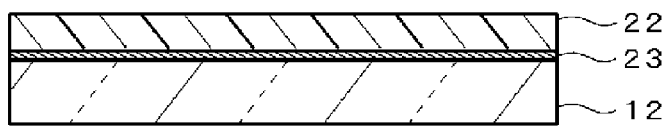

Next, the first alignment film 21 is formed over the entire insulation film 26 of the first substrate 11 (FIG. 12B), and the second alignment film 22 is formed over the entire common electrode 23 of the second substrate 12 (FIG. 12C). Hence, each alignment film is generally formed using a polyimide film that decreases the side chain density of the material used as the vertical alignment film, for example. The alignment film material is applied onto the first substrate 11 and the second substrate 12 at respective appropriate film thicknesses (about 500-800 Å, for example) by a suitable method, such as a flexographic printing method, ink jet method, spin coat method, slit coat method, slit method and spin coat method combination, or the like, and is heat treated (baked for one hour at 160-250° C., for example). Subsequently, orientation processing is performed on each of the first alignment film 21 and the second alignment film 22. Hence, a rubbing process is performed, for example, and the pushing depth serving as a condition thereof is set to 0.8 mm (strong rubbing condition). The rubbing direction is set so that the twist angle of the liquid crystal molecules on each of the substrates becomes a predetermined angle when the first substrate 11 and the second substrate 12 are superimposed.

Figure 12D:
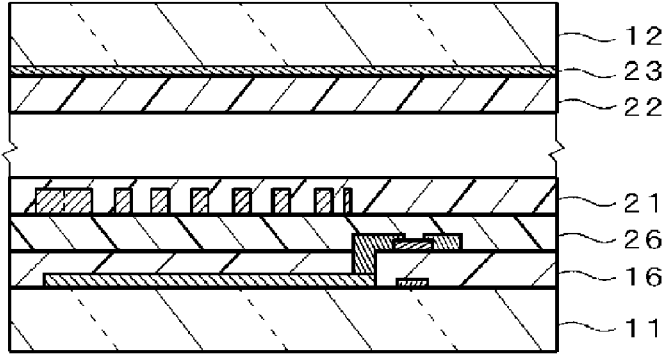

Next, a main sealing agent that contains the proper quantity (2-5 wt %, for example) of gap control agent is formed on one substrate (the first substrate 11, for example). The main sealing agent is formed by screen printing or a dispenser, for example. Further, the diameter of the gap control agent is set so that the thickness of the liquid crystal layer 24 is about 4 μm. Further, the gap control agent is sprayed on the other substrate (the second substrate 12, for example). In this embodiment, for example, plastic balls with a particle size of 4 μm are sprayed by a dry-type gap sprayer. Subsequently, the first substrate 11 and the second substrate 12 are superimposed, and the main sealing agent is hardened by a heating process with pressure constantly applied by a press or the like. Hence, a three-hour heating process is performed at 150° C., for example (FIG. 12D).

Figure 12E:
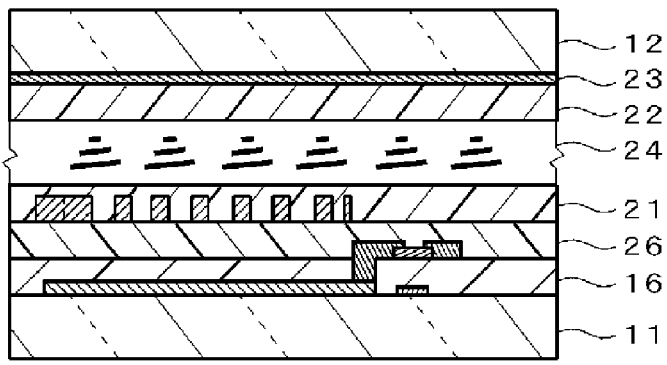

Next, the liquid crystal layer 24 is formed by filling the gap between the first substrate 11 and the second substrate 12 with a liquid crystal material (FIG. 12E). The liquid crystal material is filled by a vacuum injection method, for example. In this embodiment, a liquid crystal material with a positive dielectric anisotropy Δ∈ and added chiral material is used. The added amount of chiral material is set so that d/p is preferably greater than or equal to 0.04 and less than or equal to 0.6, more preferably 0.16, for example. After injection of such a liquid crystal material, an end sealing agent is applied to the injection port to seal the port. Then, a suitable heating process (one hour at 120° C., for example) at a temperature greater than the phase transition temperature of the liquid crystal material is performed, thereby arranging the orientation state of the liquid crystal molecules of the liquid crystal layer 24.

Next, the first polarizing plate 31 is bonded to the outer side of the first substrate 11, and the second polarizing plate 32 is bonded to the outer side of the second substrate 12. The transmission axes of the first polarizing plate 31 and the second polarizing plate 32 are arranged in a substantially perpendicular alignment (crossed-Nicol alignment). With the above, the R-TN mode liquid crystal element of embodiment 1 is completed (refer to FIG. 9).

The state of the R-TN mode liquid crystal element completed via a process such as described above when voltage is applied to the liquid crystal layer using each electrode, thereby inducing the transitions between the splayed twist state and the reversed twist state, is verified as follows.

In the initial state, the liquid crystal molecules of the liquid crystal layer 24 of the R-TN mode liquid crystal element of this embodiment are oriented in a splayed twist state. In this splayed twist state, from the standpoint of appearance, a white (bright) display of a relatively bright state is obtained. Conversely, a vertical electric field is produced using the first electrode 13 and the common electrode 23 as described above. For example, AC voltage (rectangular wave) of 10 V and 100 Hz is applied for approximately 0.01-0.5 seconds, and subsequently application of the voltage was quickly stopped. As a result, the orientation state of the liquid crystal layer 24 transitions to the reversed twist state. In this reversed twist state, from the standpoint of appearance, a black (dark) display of a relatively dark state is obtained. Given that the liquid crystal display apparatus is configured by arranging this R-TN mode liquid crystal element into a matrix shape, for example, it is possible to control state transitions on a per individual pixel basis (per element basis) during the transition from this splayed twist state to the reversed twist state. At this time, the first electrode 13 needs to be in an electrically free state.

Next, the thin film transistor is changed to a conductive state by applying a predetermined voltage to the scan line 15, and voltage is applied to the second electrode 20 by applying a predetermined voltage to the signal line 25. With this arrangement, since a relative electric potential difference occurs between the first electrode 13 and the second electrode 20, with the application of a horizontal electric field to the liquid crystal layer 24, the orientation state of the liquid crystal layer 24 transitions from a reversed twist state to a splayed twist state. The voltage (gate voltage) applied to the scan line 15 is set to a pulse wave of 10 V, for example, and the voltage applied to the signal line 25 is set to a voltage that inverts the ±10 V on a per frame basis, for example. The duration that the horizontal electric field is applied is about 0.01-0.5 seconds, for example.

In both the splayed twist state and the reversed twist state described above, the orientation state is maintained even after the voltage application is stopped, making it possible to suppress power consumption to an extremely low value without any need to apply voltage whatsoever after the display is rewritten. Given that the liquid crystal display apparatus is configured by arranging this R-TN mode liquid crystal element into a matrix shape, for example, in this embodiment, it is possible to control state transitions on a per pixel basis during both the transition from the splayed twist state to the reversed twist state and the transition from the reversed twist state to the splayed twist state. Accordingly, compared to embodiment 2 described later, the degree of freedom of display rewriting is further increased. For example, with all currently proposed electrophoresis electronic paper displays, the entire screen needs to be temporarily reset to a white display or a black display; if resetting is not performed, transitioning all electrophoretic particles to a preferred position may no longer be possible or the electrophoretic particles may become skewed when repeated display switching is performed. According to this embodiment, however, such disadvantages cannot occur.

On the other hand, when a horizontal electric field is further applied to the liquid crystal layer in a splayed twist state, the orientation state changes so that the twisted orientation becomes untwisted in the liquid crystal layer as described above and changes to this orientation state continually occur according to the strength of the electric field. Specifically, while the liquid crystal molecules are substantially uniformly oriented along the electric field direction in the bulk of the liquid crystal layer, the area near the boundary surface with the substrate receives an orientation restricting force by the alignment film and thus the orientation direction substantially does not change. As a result, the twisted orientation of the splayed twist state collapses, and the polarization state of the light that passes through this liquid crystal layer also changes.

Embodiment 2

Figure 13:
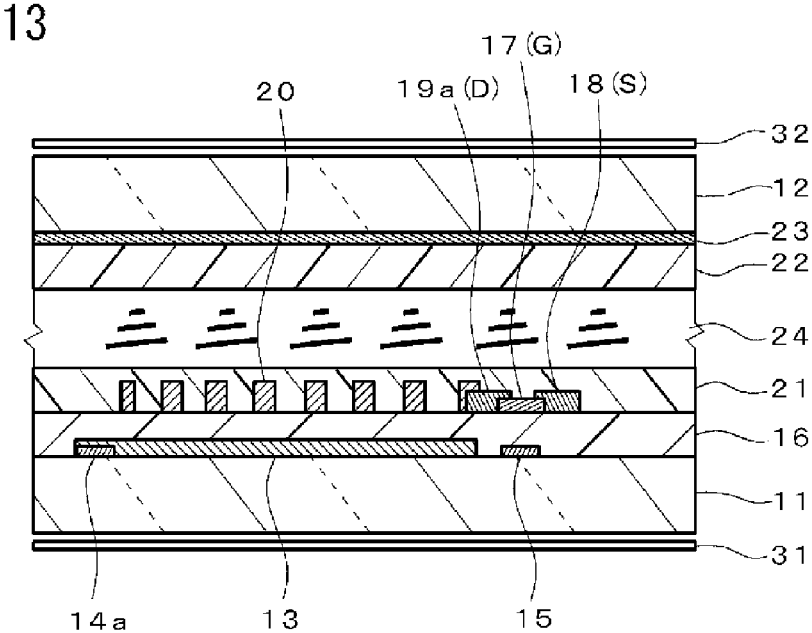
FIG. 13 is a cross-sectional view showing a configuration example of the R-TN mode liquid crystal element of embodiment 2.
Figure 14:
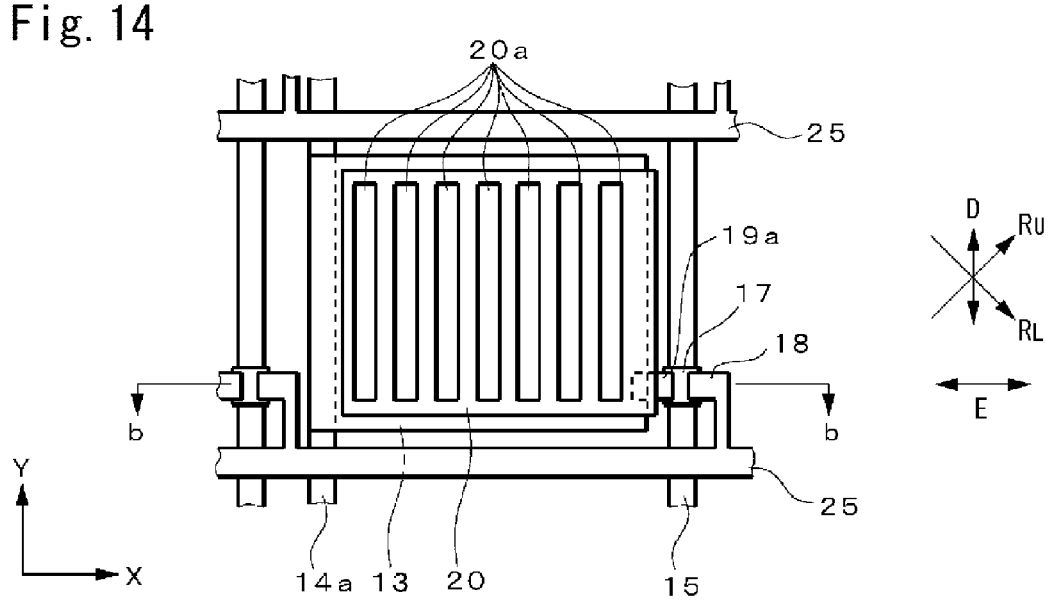
FIG. 14 is a plan view of the R-TN mode liquid crystal element shown in FIG. 13.

FIG. 13 is a cross-sectional view showing a configuration example of the R-TN mode liquid crystal element of embodiment 2. Further, FIG. 14 is a plan view of the R-TN mode liquid crystal element shown in FIG. 13. It should be noted that FIG. 13 shows a cross-section along a line b-b shown in FIG. 14. The R-TN mode liquid crystal element of this embodiment shown in each figure is configured to comprise the first substrate (lower substrate) 11, the second substrate (upper substrate) 12, the first electrode 13, a common line 14a, the scan line 15, the insulation film 16, the semiconductor film 17, the source electrode 18, the drain electrode 19a, the second electrode (pixel electrode) 20, the first alignment film 21, the second alignment film 22, the common electrode 23, the liquid crystal layer 24, the signal line 25, the first polarizing plate (lower polarizing plate) 31, and the second polarizing plate (upper polarizing plate) 32. It should be noted that the components common to embodiment 1 use the same reference numerals, and detailed descriptions thereof are omitted.

The common line 14a is provided on one surface side of the first substrate 11, and extends in one direction (the direction Y shown in FIG. 14). A predetermined electric potential is applied to the first electrode 13 via this common line 14a. As the common line 14a, a metal film such as a layered film of aluminum and molybdenum is used, for example.

The insulation film 16 is provided on one surface side of the first substrate 11, covering the first electrode 13, the common line 14a, and the scan line 15. As this insulation film 16, a silicon nitride film, a silicon oxide film, or a layered film thereof is used, for example.

The drain electrode 19a is provided to a predetermined position on the insulation film 16, and a part thereof is connected to the semiconductor film 17. As this drain electrode 19a, a metal film such as a layered film of aluminum and molybdenum is used, for example.

The second electrode 20 is provided to a predetermined position on the insulation film 16, and at least a part thereof is superimposed with the first electrode 13 described above. This second electrode 20 comprises a plurality of the openings (slits) 20a, as shown in FIG. 14. This second electrode 20 is obtained by patterning a transparent conductive film such as indium-tin oxide (ITO), for example. The size of the second electrode 20 can be set so that the width of the linear part that exists between each of the openings 20a (the length in the direction X in FIG. 14) is approximately 20 µm, and the width of each of the openings 20a (the length in the direction X in FIG. 14) is approximately 20 µm, for example. A horizontal electric field can be applied to the liquid crystal layer 24 by applying voltage between this second electrode 20 and the above described first electrode 13.

The first alignment film 21 is provided on the insulation film 16 on one surface side of the first substrate 11, covering the semiconductor film 17, the source electrode 18, the drain electrode 19a, and the second electrode 20. Similarly, the second alignment film 22 is provided on one surface side of the second substrate 12, covering the common electrode 23.

Next, an example of the manufacturing method of the R-TN mode liquid crystal element according to embodiment 2 will be described with reference to FIGS. 15A-15G and FIGS. 16A-16D.

Figure 15A:
FIGS. 15A-G are cross-sectional views showing an example of a manufacturing method of the R-TN mode liquid crystal element of embodiment 2.
Figure 15B:
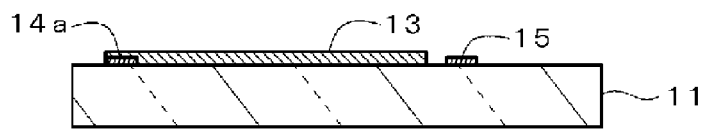
Figure 15C:
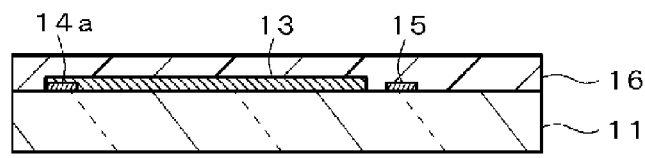

First, a glass substrate for use as the first substrate 11 and the second substrate 12 is prepared. Next, the common line 14a and the scan line 15 are formed on one surface of the first substrate 11 (FIG. 15A), and further the first electrode 13 is formed in a predetermined position on one surface side of the first substrate 11 (FIG. 15B).

Figure 15D:
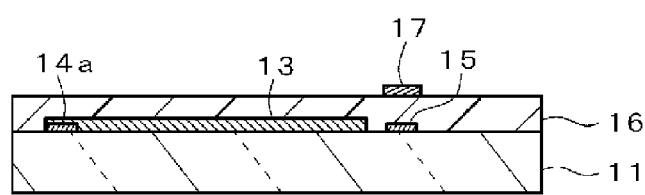
Figure 15E:
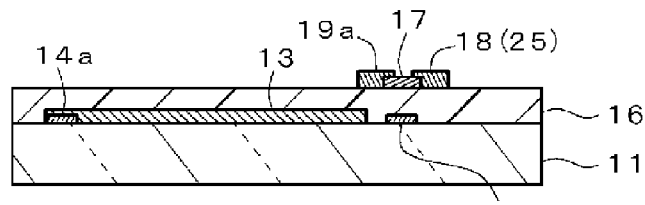

Next, an insulation film 16 is formed on one surface side of the first substrate 11, covering the first electrode 13, the common line 14a, and the scan line 15 (FIG. 15C), and further the semiconductor film 17 is formed in a predetermined position on the insulation film 16 of the first substrate 11 (FIG. 15D).

Figure 15F:
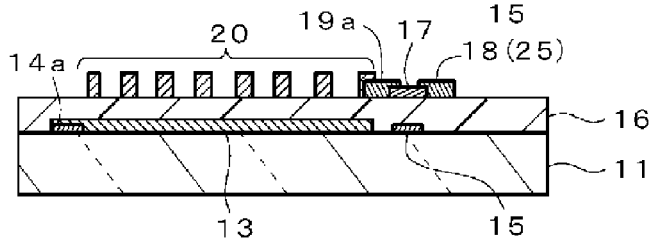
Figure 15G:

Next, the source electrode 18, the drain electrode 19a, and the signal line 25 are formed in predetermined positions on the insulation film 16 of the first substrate 11 (FIG. 15E), and further the second electrode 20 is formed in a predetermined position on the insulation film 16 of the first substrate 11 (FIG. 15F). It should be noted that a passivation film may be further provided on the insulation film 16 (not shown). On the other hand, the common electrode 23 is formed on one surface of the second substrate 12 (FIG. 15G).

Figure 16A:
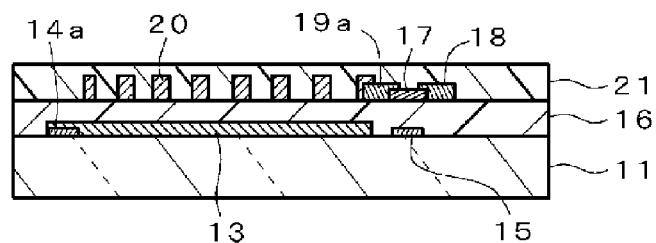
FIGS. 16A-D are cross-sectional views showing another example of a manufacturing method of the R-TN mode liquid crystal element of embodiment 2.
Figure 16B:
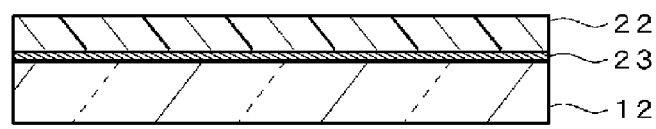

Next, the first alignment film 21 is formed over the entire insulation film 16 of the first substrate 11 (FIG. 16A), and the second alignment film 22 is formed over the entire common electrode 23 of the second substrate 12 (FIG. 16B).

Figure 16C:
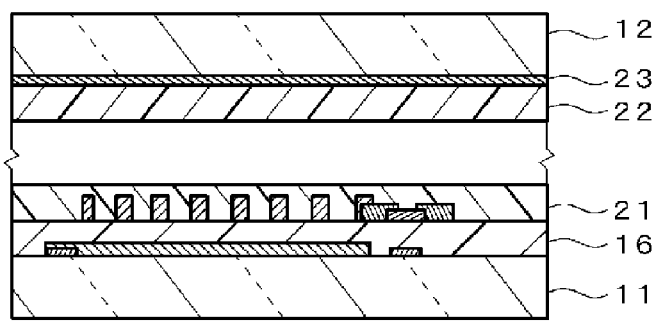
Figure 16D:
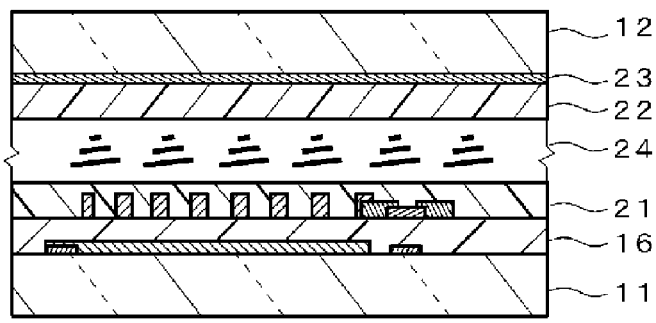

Next, a main sealing agent is formed on one substrate, a gap control agent is sprayed on the other substrate, and subsequently the first substrate 11 and the second substrate 12 are superimposed and heat treated with pressure continually applied by a press or the like, thereby hardening the main sealing agent (FIG. 16C). Next, the liquid crystal layer 24 is formed by filling the gap between the first substrate 11 and the second substrate 12 with a liquid crystal material (FIG. 16D).

Next, the first polarizing plate 31 is bonded to the outer side of the first substrate 11, and the second polarizing plate 32 is bonded to the outer side of the second substrate 12. The transmission axes of the first polarizing plate 31 and the second polarizing plate 32 are arranged in a substantially perpendicular alignment (crossed-Nicol alignment). With the above, the R-TN mode liquid crystal element of embodiment 2 is completed (refer to FIG. 13).

The state of the R-TN mode liquid crystal element completed via a process such as described above when voltage is applied to the liquid crystal layer using each electrode, thereby inducing the transitions between the splayed twist state and the reversed twist state, is verified as follows.

In the initial state, the liquid crystal molecules of the liquid crystal layer 24 of the R-TN mode liquid crystal element of this embodiment are oriented in a splayed twist state. In this splayed twist state, from the standpoint of appearance, a white (bright) display of a relatively bright state is obtained. Conversely, a vertical electric field is produced by applying voltage to the first electrode 13 and the common electrode 23, respectively. For example, AC voltage (rectangular wave) of 10 V and 100 Hz is applied for approximately 0.5-1 second, and subsequently application of the voltage is quickly stopped. As a result, the orientation state of the liquid crystal layer 24 transitions to the reversed twist state. In this reversed twist state, from the standpoint of appearance, a black (dark) display of a relatively dark state is obtained. Given that the liquid crystal display apparatus is configured by arranging this R-TN mode liquid crystal element into a matrix shape, for example, controlling state transitions on a per individual pixel (element) basis during transition from this splayed twist state to the reversed twist state is difficult, and therefore state transitions are controlled for all pixels simultaneously or on a per line basis of the plurality of first electrode 13 lines that share the common line 14.

Next, the thin film transistor is changed to a conductive state by applying a predetermined voltage to the scan line 15, and voltage is applied to the second electrode 20 via the thin film transistor by applying a predetermined voltage to the signal line 25 by the voltage applying means. With this arrangement, since a relative electric potential difference occurs between the first electrode 13 and the second electrode 20, with the application of a horizontal electric field to the liquid crystal layer 24, the orientation state of the liquid crystal layer 24 transitions from a reversed twist state to a splayed twist state. The voltage (gate voltage) applied to the scan line 15 is set to a pulse wave of 10 V, for example, and the voltage applied to the signal line 25 is set to a voltage that inverts the ±10 V on a per frame basis, for example. The duration that the horizontal electric field is applied is about 0.01-0.5 seconds, for example.

In both the splayed twist state and the reversed twist state described above, the orientation state is maintained even after the voltage application is stopped, making it possible to suppress power consumption to an extremely low value basically without any need to apply voltage after the display is rewritten. For example, given that the liquid crystal display apparatus is configured by arranging this R-TN mode liquid crystal element into a matrix shape, in a case where an operator wants to rewrite the display once again, it is possible to achieve a preferred image display by applying a vertical electric field while controlling state transitions simultaneously for all pixels or on a per line bases of the plurality of first electrode 13 lines that share the common line 14, and selectively applying a horizontal electric field on a per pixel basis by continually controlling the voltages applied and not applied to the second electrode 20 using a thin film transistor. In a case where a reader reads sentences of a short story or the like, the lines already read by the reader are best rewritten in order, and thus the method of rewriting the display on a per line basis can alleviate the stress of the reader even if some time is required for rewriting.

On the other hand, when a horizontal electric field is further applied to the liquid crystal layer in a splayed twist state, as described above, the orientation state changes so that the twisted orientation becomes untwisted in the liquid crystal layer, and changes to this orientation state continually occur according to the strength of the electric field. Specifically, while the liquid crystal molecules are substantially uniformly oriented along the electric field direction in the bulk of the liquid crystal layer, the area near the boundary surface with the substrate receives an orientation restricting force by the alignment film and thus the orientation direction substantially does not change. As a result, the twisted orientation of the splayed twist state collapses, and the polarization state of the light that passes through this liquid crystal layer also changes.

Embodiment 3

Figure 17A:
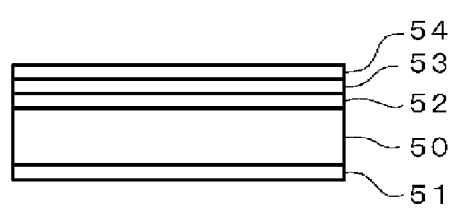
FIG. 17A is a cross-sectional view schematically showing a configuration example of the R-TN mode liquid crystal element of embodiment 3.

FIG. 17A is a cross-sectional view schematically showing a configuration example of the R-TN mode liquid crystal element of embodiment 3. The R-TN mode liquid crystal element of embodiment 3 shown in FIG. 17A is a reflective liquid crystal element that displays images utilizing external light, and comprises a liquid crystal panel 50, a reflective plate 51 disposed on the lower surface side of this liquid crystal panel 50, a scattering plate 52 disposed on the upper surface side of the liquid crystal panel 50, a λ/4 wavelength plate 53 disposed overlapping with this scattering plate 52, and a polarizing plate 54 disposed overlapping with this λ/4 wavelength plate 53. As the reflective plate 51, a silver film can be used, for example. Further, as the scattering plate 52, a plurality of overlapping plates with a haze value of 43-45% can be used, for example. Further, as the λ/4 wavelength plate 53, a plate with a phase difference of approximately 137 nm can be used, for example. It should be noted that the scattering plate 52 may be disposed on the lower surface side of the liquid crystal panel 50. In this case, the scattering plate 52 is disposed between the reflective plate 51 and the liquid crystal panel 50.

Figure 17B:
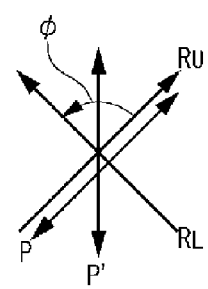
FIG. 17B is a diagram explaining the angle formed by the rubbing direction of the lower substrate and the rubbing direction of the upper substrate of the liquid crystal panel of embodiment 3.

As shown in FIG. 17B, an angle φ formed by the rubbing direction $R_L$ of the lower substrate and the rubbing direction $R_U$ of the upper substrate of the liquid crystal panel 50 is set to 30°, for example. The chiral material is added to the liquid crystal material of the liquid crystal layer so that d/p=0.1, for example. The value of Δn of the liquid crystal material of the liquid crystal layer is about 0.065-0.15, for example. A phase difference axis P' of the λ/4 wavelength plate 53 is set to an angle of substantially 45° with the transmission axis of the polarizing plate 54. The internal structure of the liquid crystal panel 50 is the same as that of the liquid crystal element of embodiment 1 or embodiment 2 described above (both excluding the polarizing plates).

Figure 18:
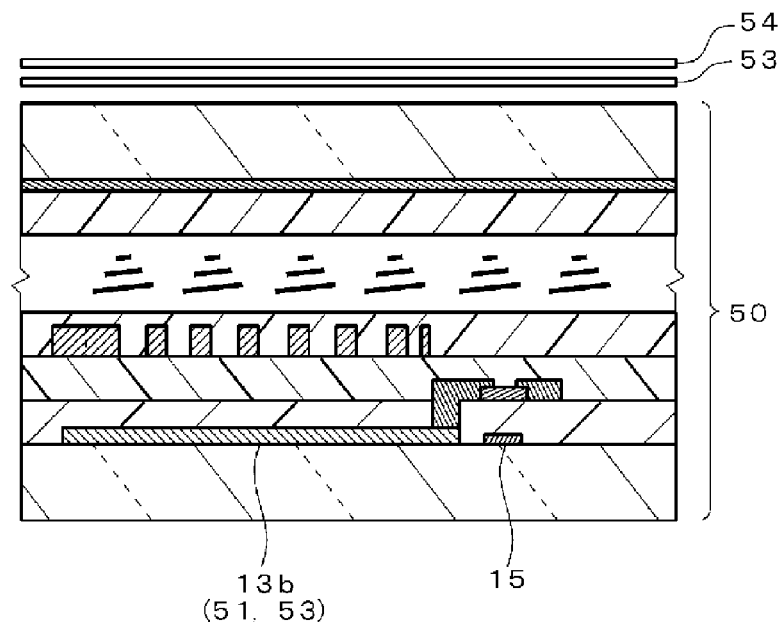
FIG. 18 is a cross-sectional view showing a configuration example of the R-TN mode liquid crystal element of embodiment 3.

FIG. 18 is a cross-sectional view showing a configuration example of the R-TN mode liquid crystal element of embodiment 3. Hence, while the example illustrates a case where the liquid crystal element of embodiment 1 is utilized as the liquid crystal panel 50, the same holds true for a case where the liquid crystal element of embodiment 2 is utilized. A first electrode 13b of this liquid crystal panel 50 is made of a metal film, and is further provided with irregularities on the surface.

As a result, the first electrode 13b can also function as the reflective plate 51 and the scattering plate 52. The manufacturing method of the R-TN mode liquid crystal element of embodiment 3 is the same as that of embodiment 1 or embodiment 2 described above, and if the formation process of the first electrode 13b is established common to that of the scan line 15, common processes can be utilized for all other processes. It should be noted that the first electrode 13b may also function as the reflective plate 51 only, and the scattering plate 52 may be externally provided as described above.

Embodiment 4

Next, a configuration example of a liquid crystal display apparatus capable of low power consumption driving that utilizes the memory property of the liquid crystal element of any of the embodiments 1-3 described above will be described.

Figure 19:
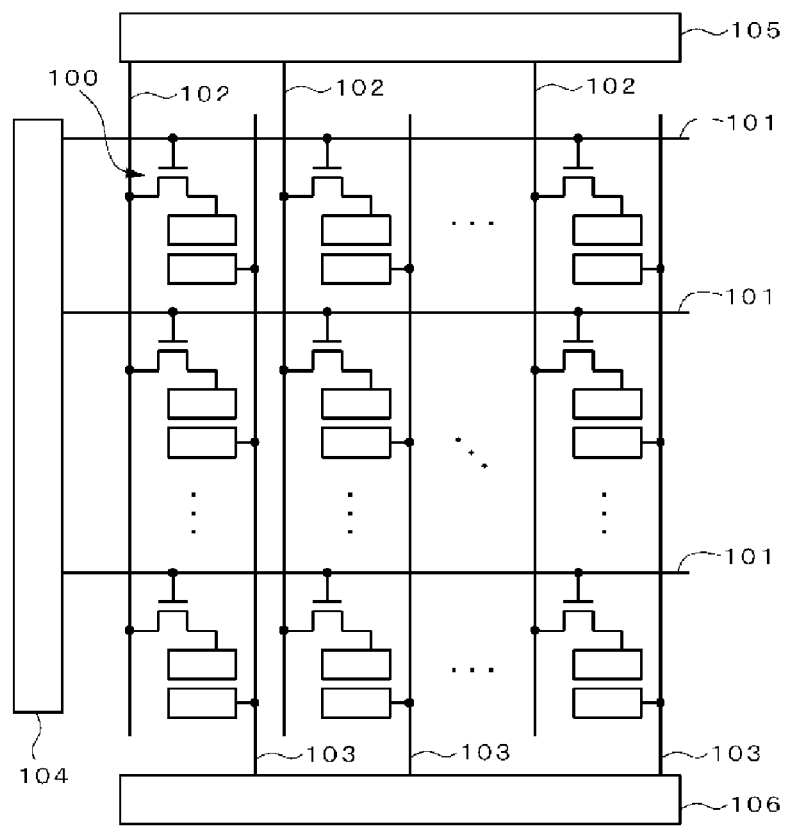
FIG. 19 is diagram schematically showing a configuration example of the liquid crystal display apparatus of embodiment 4.

FIG. 19 is a diagram schematically showing a configuration example of the liquid crystal display apparatus of embodiment 4. The liquid crystal display apparatus shown in FIG. 19 is an active matrix type liquid crystal display apparatus configured by arranging a plurality of pixel parts 100 into a matrix shape, and the liquid crystal elements of any of the embodiments described above is used as each of the pixel parts 100. Specifically, the liquid crystal display apparatus is configured to comprise a plurality of scan lines 101 that extend in a first direction, a driver 104 that supplies voltage to each of the scan lines 101, a plurality of signal lines 102 and common lines 103 that are respectively perpendicular to the scan line 101 and extend in a second direction, a driver 105 that supplies voltage to each of the signal lines 102, a driver 106 that supplies voltage to each of the common lines 103, and a pixel part 100 provided to an intersecting point of each of the scan lines 101 and each of the signal lines 102. For each of the pixel parts 100, one of the first electrode or the second electrode is connected to the common line 103, and the other is connected to a thin film transistor. Further, a common electrode is commonly provided to each of the pixel parts 100.

According to each of the embodiments such as described above, a new liquid crystal element comprising a switching element and an electrode structure suitable for generating a transition between two orientation states is obtained. Further, a liquid crystal display apparatus of low power consumption that basically does not require power other than during display rewriting is obtained by utilizing the bistability (memory property) of the two orientation states of the liquid crystal element. Furthermore, a liquid crystal display apparatus capable of supporting both half-tone displays and moving image displays is obtained. Further, contrast ratio can be improved.

Note that this invention is not limited to the subject matter of the foregoing embodiments, and can be implemented by being variously modified within the scope of the gist of the present invention.

For example, while the embodiments described above illustrates a liquid crystal element in a normally white state with the angle formed by each transmission axis of the first polarizing plate and the second polarizing plate set to about 90°, the liquid crystal element may be a liquid crystal element in a normally black state. Further, the orientation process method is not limited to a rubbing method.

Further, the structure of the thin film transistor as an example of a switching element is not limited to the illustrated bottom gate type, allowing the transistor to be a top gate type.

Further, the second electrode is not limited to an electrode comprising a plurality of slits such as described above, allowing the electrode to be a comb-shaped electrode comprising a plurality of electrode branches (linear parts), for example. Furthermore, the first electrode may be a comb-shaped electrode, and each of the electrode branches of the second electrode and each of the electrode branches of the first electrode may be alternately disposed. In this case, the first electrode and the second electrode can be disposed on the same surface to produce a horizontal electric field (IPS mode).

What is claimed is:

1. A liquid crystal element comprising:
    a first substrate and a second substrate subjected to an orientation process on one surface of each of the first substrate and the second substrate, the first substrate and the second substrate being disposed facing each other;
    a liquid crystal layer provided between the first substrate and the second substrate; and
    an electric field applying section that applies an electric field to the liquid crystal layer, the electric field applying section comprising a first electrode provided on one surface side of the first substrate, a second electrode provided on one surface side of the first substrate, away from the first electrode, and a common electrode provided on one surface side of the second substrate so that at least a portion thereof is superimposed with the first electrode and the second electrode;
    wherein:
    the first substrate and the second substrate are disposed with an angle formed by the respective orientation processing directions greater than or equal to 0° and less than 40°, making it possible to achieve a first orientation state that includes a twist in the liquid crystal molecules of the liquid crystal layer by an orientation regulating force from the orientation process,
    the liquid crystal layer includes chiral material capable of generating a second orientation state that includes a twist different from that of the first orientation state in the liquid crystal molecules of the liquid crystal layer,
    the liquid crystal layer transitions from the second orientation state to the first orientation state by the application of an electric field in a layer thickness direction of the liquid crystal layer by the electric field applying section, and transitions from the first orientation state to the second orientation state by the application of an electric field in a direction perpendicular to the layer thickness direction by the electric field applying section, and further, after transitioning to the second orientation state, by applying an electric field of the direction perpendicular to the layer thickness direction by the electric field applying section, a continuous orientation change regarded as an elastic deformation occurs in accordance with a strength of the electric field, and returns to the second orientation state caused by the elastic deformation when the electric field is subsequently released, and
    an angle between (i) a longitudinal direction of a liquid crystal molecule located substantially at a center of the layer thickness direction of the liquid crystal layer in the second orientation state, and (ii) the direction of the electric field applied by the electric field applying section in the direction perpendicular to the layer thickness direction, is within a range greater than 0° and less than or equal to 45°.

2. The liquid crystal element according to claim 1, further comprising:
    a switching element that is provided on one surface side of the first substrate and connected to the first electrode or the second electrode.

3. The liquid crystal element according to claim 1, wherein:
    the first substrate and the second substrate each impart a pretilt angle of 35° or greater and 47° or less to the liquid crystal molecules of the liquid crystal layer on the boundary surface with the liquid crystal layer.

4. The liquid crystal element according to claim 2, wherein:
    the first substrate and the second substrate each impart a pretilt angle of 35° or greater and 47° or less to the liquid crystal molecules of the liquid crystal layer on the boundary surface with the liquid crystal layer.

5. The liquid crystal element according to claim 1, wherein:
    at least one of the first electrode and the second electrode comprises a plurality of linear parts disposed parallel to and away from each other.

6. The liquid crystal element according to claim 2, wherein:
    at least one of the first electrode and the second electrode comprises a plurality of linear parts disposed parallel to and away from each other.

7. The liquid crystal element according to claim 5, wherein:
    the orientation directions of the liquid crystal molecules in the substantial center of the layer thickness direction of the liquid crystal layer in the first orientation state comprise an angle of 0° to 45° with respect to the extending direction of each of the plurality of linear parts.

8. The liquid crystal element according to claim 6, wherein:
    the orientation directions of the liquid crystal molecules in the substantial center of the layer thickness direction of the liquid crystal layer in the first orientation state comprise an angle of 0° to 45° with respect to the extending direction of each of the plurality of linear parts.

9. A liquid crystal display apparatus comprising:
    a plurality of pixel parts, wherein each of the plurality of pixel parts is configured using the liquid crystal element according to claim 1.

10. A liquid crystal display apparatus comprising:
    a plurality of pixel parts, wherein each of the plurality of pixel parts is configured using the liquid crystal element according to claim 2.

11. A liquid crystal display apparatus comprising:
    a plurality of pixel parts, wherein each of the plurality of pixel parts is configured using the liquid crystal element according to claim 3.

12. A liquid crystal display apparatus comprising:
    a plurality of pixel parts, wherein each of the plurality of pixel parts is configured using the liquid crystal element according to claim 4.

* * * * *